Aug. 29, 1939.   V. H. CHRISTEN   2,170,939
WINDSHIELD WIPER CLIP
Filed July 1, 1935
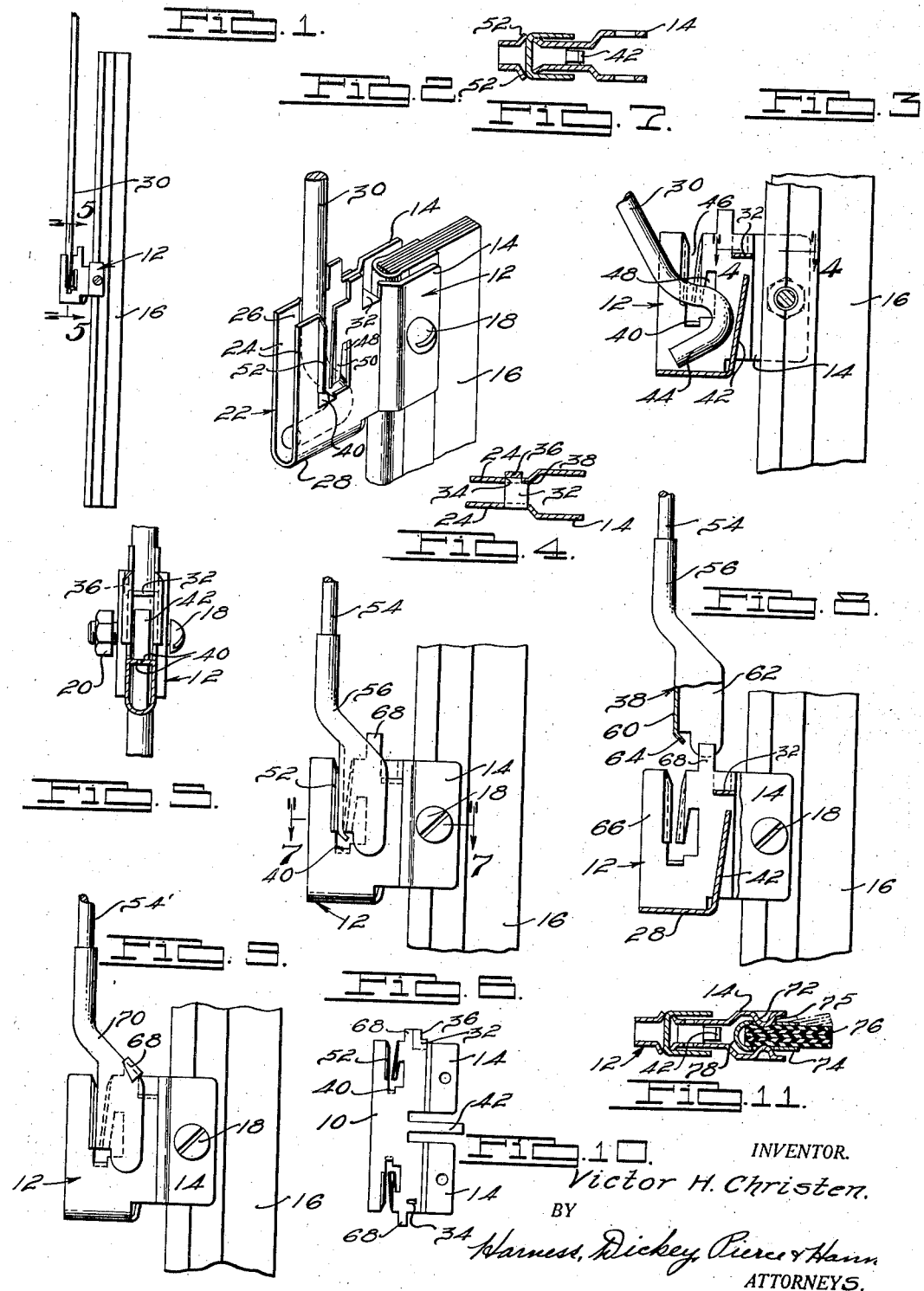
INVENTOR.
Victor H. Christen.
BY
Harness, Dickey, Pierce & Hann
ATTORNEYS.

Patented Aug. 29, 1939

2,170,939

UNITED STATES PATENT OFFICE 2,170,939

WINDSHIELD WIPER CLIP

Victor H. Christen, Detroit, Mich., assignor of fifty per cent to Superior Seal & Stamp Company, a corporation of Michigan Application July 1, 1935, Serial No. 29,283

5 Claims. (Cl. 15—250)

This invention relates to an improved detachable coupling.

More particularly the invention pertains to a device of this character for detachably coupling windshield wiper blades to their operating arms.

There are available a plurality of different makes and types of windshield wiping mechanism, most of which are provided with operating arms that are adapted to be detachably secured to wiper blades equipped with a particular coupling element of only one construction. Vendors of replacement blades are, therefore, required to stock a large variety of makes and types of wiper blades. Frequently users of windshield wiping mechanism, popular in one section of the country, encounter much difficulty in obtaining replacement blades having proper coupling elements in a different section of the country.

One of the main objects of the invention is to provide coupling elements of this character which are detachably securable to windshield wiper operating arms of a large variety of different shapes and constructions.

Another object of the invention is to provide windshield wiper blade coupling elements which completely satisfy all of the requirements of devices of this character when applied on any of the conventional windshield wiper arms.

A further object of the invention is to provide a one-piece structure of this kind which may be formed of sheet metal by stamping operations.

Additional objects of the invention are to provide a channel in a device of this kind having opposite side wall portions held in a minimum spaced relationship by integral parts of the device which also serve to interlock with portions of an operating arm of one construction, so as to detachably secure a wiper blade thereto; to provide inwardly extending integral ears on the side wall portions of the main channel of the device for accomplishing the foregoing purpose; to provide improved means consisting of an integral part of the coupling, for holding the side wall portions thereof against relative movement and deflection and which are so constructed and arranged as to limit movement of the coupling with respect to associated wiper blades; to provide an abutment between the channel in which certain types of operating arms are receivable, for preventing engagement of the latter with the wiper blade during coupling and uncoupling operations; and to provide an abutment of this character comprising an integral part of the structure of the coupling which also assist in holding the coupling against unintended detachment from the wiper arm and which may be biased between the wiper arm and blade in order to prevent vibratory rattling of the parts of the structure.

Other objects of the invention are to provide registering slots in the walls of the channel in which one form of operating arm is receivable, for accommodating a coupling element of a different type of operation arm; to provide slots of this character which are open at the opposite longitudinal extremities of the channel, and which have reversely extending or undercut inner end sections spaced from and communicating with the main portion of the slot; to provide resiliently yieldable metal fingers between the main and undercut portions of the slot which are adapted to deflect to accommodate insertion of the attaching end portion of the wiper arm into the slot and which have extremities so constructed and arranged as to positively hold the operating arm and coupling against unintended separation; and to provide deformable ears at the entrance of the main channel of the coupling, which may be relied upon to hold a wiper operating arm, not equipped with an abutment engageable by the extremities of the fingers, against separation from the coupling.

Still further objects of the invention are to provide a coupling of this character which is detachably securable to a wiper blade by a snap-on fastening action; to provide snap-on fastening means on a coupling of this kind which is adapted to clampingly engage the yieldable wiping element of a windshield wiper blade in such manner as to accommodate relative universal movement and flopping action of the wiper blade during operation; and to provide fastening means of this character which requires for their reception only the formation of registering apertures in the opposite sides of the marginal metal portion of a wiper blade.

The above being among the objects of the present invention, the same consisting of certain novel features of construction and combinations of parts to be hereinafter described with reference to the accompanying drawing, and then claimed, having the above and other objects in view.

Illustrated embodiments of the invention are shown in the drawing in which:

Fig. 1 is a side elevational view of a windshield wiper blade having a coupling embodying the invention and illustrating one type of operating arm with which the coupling is detachably securable;

Fig. 2 is an enlarged, perspective view of the coupling element showing the structure with which it is illustrated in Fig. 1;

Fig. 3 is a longitudinal, vertical sectional view of the coupling element, showing the internal structure thereof and illustrating the relative positions the parts of the structure occupy during coupling and uncoupling operations;

Fig. 4 is a fragmentary transverse sectional view taken on the line 4—4 of Fig. 3;

Fig. 5 is a fragmentary vertical sectional view taken on the line 5—5 of Fig. 1;

Fig. 6 is an enlarged fragmentary side elevational view of the coupling element illustrated in Fig. 1, but showing a windshield wiper operating arm of a different construction detachably secured thereto;

Fig. 7 is a horizontal sectional view taken on the line 7—7 of Fig. 6;

Fig. 8 is a fragmentary, vertical central sectional view of the coupling element, but illustrating the coupling operation involved in detachably securing a windshield wiper blade to an operating arm of the form shown in Fig. 6;

Fig. 9 is a fragmentary enlarged side elevational view of the improved coupling illustrating the manner of attachment thereto of a third form of windshield wiper operating arm;

Fig. 10 is a plan view of a stamped sheet metal blank from which a coupling member, embodying the invention, may be conveniently formed;

Fig. 11 is a transverse sectional view of an assembly of a windshield wiper blade, operating arm and coupling device embodying a modified form of the invention and which may be attached to and detached from a wiper blade by a snap-on action.

In the form of the invention illustrated in the drawing, the improved coupling includes a sheet metal stamping preferably constructed from a cut-out blank 10, illustrated in Fig. 10, which is folded midway its length into a U shape so as to provide a member, generally designated by the numeral 12. Opposite side walls of the member 12 are outwardly offset and extended as at 14 for the purpose of receiving between a windshield wiper blade 16. The side wall portions 14 thereof are provided with registering apertures through which a bolt or screw 18 extends. The bolt 18 may pivotally support the wiper blade 16, or if desired, and particularly when the coupling is used in conjunction with one form of operating arm, the bolt 18 may firmly clamp the wiper blade 16 between the side walls 14 by tightening the nut 20 with which the bolt 18 is provided.

The main body portion of the coupling, generally designated by the numeral 22, is of channel section having opposite side wall portions 24, an open extremity 26 and a longitudinally opposite closed extremity 28. The portion 22 is adapted to be detachably connected with windshield wiper arms of diverse construction, one form of operating arm 30 with which the portion 22 may be detachably connected, being illustrated in Figs. 1 to 5, inclusive.

The opposite side wall portions 24 and 14 of the member 12 are held in a predetermined spaced relationship and also secured against separatory movement by an ear 32 formed on one side wall portion 24 as illustrated in Figs. 2 and 4. The ear 32 extends transversely of the space between the wall portions 24 and is provided at its outer extremity with a tab 36 which extends through an aperture 34 in the opposite side wall portion 24 of the channel. The tab 36 is narrower than the ear 32 and its external end portion is bent over into contacting relationship with the outer surface of the side wall portion 24 in which the aperture 34 is formed so as to hold the respective side wall portions of the channels 12 and 22 against separatory movement. A shoulder 38 on the outer end of the ear 32 abuts an internal surface of the latter side wall 24 and assists in holding the side walls of the member 12 apart.

The central part of the side wall portions 24 of the channel 22 are held against inward movement toward each other by a pair of ears 40 struck from the sheet metal of the structure. The ears 40 extend inwardly of the channel at the central portion thereof and they have abutting extremities. The inwardly extending ears 40 also provide a transversely extending abutment which cooperates with the form of operating arm 30 illustrated in Figs. 1 to 5, inclusive, in a manner hereinafter set forth.

Formed integral with the closed extremity 28 of the channel shaped portion 22 is a tongue 42 which is integrally attached at one extremity to the coupling element, and which has a free end portion disposed between the side walls 14 and 24 respectively. The tongue 42 is preferably relatively resilient and it forms a yieldable partition between the wiper blade and operating arm receiving socket of the coupling. This partition serves to prevent contact of the operating arm 30 with the wiper blade during coupling and uncoupling operations and it may, if desired, be resiliently biased between the coupling and the operating arm 30 so as to hold the wiper blade, coupling and operating arm against vibratory rattling.

The operating arm shown in Figs. 1 to 5, inclusive, comprised a relatively straight shank portion and a hook shaped end portion 44 which is engageable between the side wall portions 24 of the channel shaped main body portion 22. During attachment of the coupling and wiper blade 16, the outer extremity of the hook end portion 44 of the operating arm is engaged between the side wall 24 while the operating arm is disposed substantially perpendicular to the length of the wiper blade 16. During this operation, the operating arm 30 is inserted into the passage between the side wall portion 24 until the hooked end portion thereof abuts the tongue 42. Rotation of the coupling element in a counter-clockwise direction, as viewed in Fig. 3, will then bring the operating arm into the relationship illustrated in Fig. 2 with the hooked end portion 44 thereof partially encompassing the abutment provided by the transversely extending ears 40 of the respectively opposite side wall portions 24. The ears 40 prevent outward movement of the operating arm 30 with respect to the coupling and the closed extremity 28 of the channel shaped main body portion 22 prevents relative movement of the parts in an opposite direction. The transversely extending ear 32 limits the counter-clockwise rotation of the coupling 22 relative to the arm 30 during the attaching operation, and thus prevents such counter-clockwise movement from being continued to such an extent as to permit the coupling 22 to be slid along the arm 30 away from the hooked end thereof. Any such continued counter-clockwise movement would bring the back of the blade 16 into engagement with the arm 30, but, due to the usual sloppy fit between the blade and the coupling, it is preferred not to rely on such engagement to limit the counter-clockwise rotation. Such rotation during the attaching operation is effectively limited by the ear 32. The wiper blade 16 may be detached from the operating arm 30 by rotation of the blade and coupling attached thereto in a clockwise direction, as viewed in Fig. 3, so as to bring the outer end portion of the hooked part of the operating arm 30 into substantially parallel relationship to the length of the main body portion 22 and thereby permit separatory movement of the coupling element and operating arm.

Formed in the opposite side wall portions 24 of the main body portion 22 are longitudinally extending slots 46 which extend from the open extremity 26 to the inwardly extending ears 40. The slots 46 have undercut end portions 48 at their inner extremities by which are provided inwardly extending yieldable fingers 50. The fingers 50 are disposed between the main lengths 46 of the slots and the undercut portions 48 thereof, as illustrated in Fig. 2. The sheet metal of the longitudinal edge portions of the slots 46 are bent outwardly to provide flanges 52 which taper in width from a maximum width at the open extremity 26 of the channel of the portion 22 to a minimum width at their inner end portions. The tapering shape of the lips 52 provide the slot 46 with converging longitudinal extremities and present an enlarged entrance at the open ends thereof to facilitate convenient insertion thereinto of the attaching element of a windshield wiper operating arm 54 of the type illustrated in Figs. 6, 7 and 8.

The windshield wiper arm 54, illustrated in Figs. 6, 7 and 8, is provided at its free end with an attaching element 56 comprising a channel shaped end portion, generally designated by the numeral 58 having a web portion 60 and opposite side flanges 62. The opposite side flanges 62 extend slightly beyond the outer extremity of the web portion 60 and the latter is provided with an inclined lip 64 which extends between the side planes of the flanges 62. The longitudinal extremities of the channel 58 of the operating arm 54 are open and the channel is adapted to be detachably connected with the coupling by bringing the latter and the operating arm 54 into the relationship illustrated in Fig. 8, and then moving the wiper blade 16 and coupling element attached thereto upwardly, as viewed in Fig. 8, so as to insert the web portion 60 of the channel 58 into the opposite slots 46 of the side walls 24 of the portion 22. During this operation the side flanges 62 of the operating arm 54 are disposed adjacent the exterior surfaces of the side walls 24.

As the web portion 60 of the channel operating arm 54 is inserted into the slots 46, the lip 64 of the web 60 bears upon the resiliently yieldable fingers 50, which deflect to accommodate the assemblying operations. After the lip 64 passes beyond the extremities of the fingers 50, the latter return to their normal positions and become engaged against the under surface of the lip 64 so as to positively interlock the coupling and operating arm against separatory movement. During the assemblying operation the flanges 52 along the longitudinal side edges of the slots 46, serve as bearing surfaces to protect the channel 58 against injuries by application thereon of excessively high unit pressures, thus preventing scratching and other wear of the parts of the structure.

The wiper blade 16 may be detached from the operating arm 54 by bending the sections 66 of the side walls 24 which are disposed between the slots 46 and the outer extremity of the portion 22, outwardly about axes extending along the inner extremities of the ears 40. After removal of the wiper blade from the wiper arm, the section 66 of the side wall portions 24 may be pinched together or otherwise restored to their normal relationship with respect to the remaining portions of the side walls, in order to condition the coupling for reattachment to the same or another operating arm.

In Fig. 9 as illustrated a detachable connection between the improved windshield wiper blade 10 coupling and a form of operating arm 54' which is substantially identical to the operating arm 54, shown in Figs. 6, 7 and 8, and which differ therefrom only in that the inwardly extending lip 64 of the arm 54 is not provided. Identical parts of the arms 54 and 54' are designated by similar numerals and the initial steps in the operation of connecting the operating arm 54' with the coupling element are identical to those set forth in the discussion of Figs. 6, 7 and 8. In order to detachably secure a wiper blade 16 to an operating arm of the character shown in Fig. 9, the opposite side wall portions 24 of the coupling are provided with flanges or tabs 68 which extend outwardly from the open extremity of the portion 22 and are adapted to be bent around the inclined edge portions 70 formed on the side flanges 62 of the attaching end portion 58 of the arm 54' as illustrated in Fig. 9. The flanges 68 positively hold the operating arm against detachment from the coupling and windshield wiper blade with which it is associated and they may readily be bent inwardly or straightened with the aid of a screw driver, pliers, or other suitable tool to accommodate separation of the wiper blade from the operating arm.

The normal flop action desired in a windshield wiper blade during oscillation thereof may be provided for by allowing sufficient looseness between the side walls 14 of the channel section 12 and the sides of the blade, the portion 22 in such case firmly gripping the end of the arm, but if desired a sufficiently loose fitting engagement between the channel section 22 and the operating arm of any of the foregoing forms may be provided for to accommodate the flop action. The former method, however, is shown and is usually desirable.

The improved universal coupling illustrated in Figs. 1 to 10, inclusive, or any other form of coupling device, may be conditioned for snap-on detachable engagement with a wiper blade in accordance with the form of the invention illustrated in Fig. 11. For the purpose of illustration, that portion of the coupling with which the operating arm is detachably associated is substantially identical in construction to the coupling shown in Figs. 1 to 10, inclusive, but in place of the registering apertures provided in the side walls 14 of the channel section 12 of the coupling, the side walls 12' of the coupling element shown in Fig. 11, are provided with inwardly extending, substantially semi-spherical projections 72 which are adapted to extend through apertures 75 in the sheet metal reinforcing or backing member 74 that is provided on the edge portions of yieldable wiping element 76 of a wiper blade in accordance with conventional practice. The apertures 75 in the side walls of the backing member 74 are preferably provided with a sufficiently large diameter to accommodate universal movement of the wiper blade with respect to the coupling. These apertures expose the resilient wiping element 76 which preferably comprises rubber, and permit the projections 72 to sink thereinto sufficiently to provide a secure clamping engagement between the coupling and the wiper blade. A coupling formed in accordance with the structure shown in Fig. 11 may, if desired, be permanently attached to the operating arm with which it is associated, and convenient replacement of the wiping blade may be accomplished by simply rotating the latter relative to the coupling beyond its normal limiting position so as to cam the projections 72 out of the apertures 75. The backing member 74 preferably has a rounded edge portion 78 which serves as a pilot enabling convenient attachment of the wiping blade to the coupling by merely forcing the rounded edge portion 78 between the projection 72 until the latter register which extend into the apertures 75.

Windsheld wiper couplings made in accordance with the invention may be conveniently attached to a plurality of different types of operating arms without in any way injuring or deforming the operating arm so that many blade replacements may be made. The coupling may be conveniently formed from a single piece of sheet metal stock by simple stamping operations and all elements thereof required to hold the coupling in its finished form comprise integral parts of the sheet metal structure. These parts serve dual purposes in that they not only hold the respective portions of the device in their intended relationship, but they also cooperate with the various forms of wiper arm to which the device is securable in such a manner as to prevent unintended detachment thereof and to limit relative movement and rotation of the wiper arm and wiper blade.

Formal changes may be made in the specific embodiment of the invention described without departing from the spirit and substance of the broad invention, the scope of which is commensurate with the appended claims.

What is claimed is:

1. In windshield wiping apparatus including a wiper blade and an operating arm having a channel-shaped end portion provided with an inwardly extending lip on its web part, a coupling element securable to said blade and including a U-shaped section having spaced wall portion provided with registering slots for receiving the web of the channel-shaped end portion of said operating arm, the inner ends of said slots being undercut, and yieldable fingers between the main lengths of said slots and the undercut portions thereof, said fingers being deflectable to accommodate the passage of the lip of said operating arm into said slots and having extremities engageable therewith for holding said arm against disengagement from said coupling.

2. In windshield wiping apparatus including a wiper blade and an operating arm having a channel-shaped end portion provided with an inwardly extending lip on its web part; a coupling element securable to said blade and including a U-shaped section having spaced wall portion provided with registering slots for receiving the web of the channel shaped end portion of said operating arm, the inner ends of said slots being undercut and tapering portions of the edge portions of the main length of said slots being bent outwardly to provide converging bearing surfaces, and yieldable fingers between the main lengths of said slots and the undercut portions thereof, said fingers being deflectable to accommodate the passage of the lip of said operating arm into said slots and having extremities engageable therewith for holding said arm against disengagement from said coupling.

3. A coupling element for detachably securing a windshield wiper blade to a windshield wiper operating arm including a U-shaped sheet metal section having a channel therein and provided with opposite side wall portions and a closed end wall portion, means on said U-shaped section extending transversely of said channel for limiting movement of said side wall portions toward each other and adapted to cooperate with said operating arm for detachably retaining the said arm in the closed end portion of said U-shaped section, an ear on one of said side wall portions extending transversely of said channel and positioned for engagement by an arm positioned in said channel for limiting rotation of said arm in one direction relative to said U-shaped section, and a spring finger extending lengthwise of said channel having a free end portion normally biased between said coupling element and said arm for restraining relative vibratory movements thereof and eliminating rattling.

4. A coupling element for detachably securing a windshield wiper blade to a windshield wiper operating arm including a U-shaped portion having extended side wall portions securable to said windshield wiper blade and having a channel therein provided with opposite side wall portions and a closed end wall portion, means on said U-shaped portion for cooperating with an end portion of said operating arm to detachably connect the latter thereto, and a spring finger carried by said U-shaped portion and extending longitudinally of said channel from the said end wall portion thereof, said spring finger being resiliently biased between said operating arm and said coupling element for restraining relative vibratory movements thereof and eliminating rattling.

5. A coupling element for detachably securing a windshield wiper blade to a windshield wiper operating arm including a U-shaped portion having extended side walls adapted to receive a windshield wiper blade between them and having a channel therein provided with opposite side wall portions and a closed end wall portion, means on said U-shaped portion for cooperating with an end portion of said operating arm to detachably connect the latter thereto, and a spring finger extending longitudinally of said channel from the said end wall portion and biased between said operating arm and said U-shaped section for restraining relative vibratory movements thereof and eliminating rattling, said spring finger being disposed between said first mentioned side walls and said means.

VICTOR H. CHRISTEN.